(12) United States Patent
Jeong et al.

(10) Patent No.: US 9,900,093 B2
(45) Date of Patent: Feb. 20, 2018

(54) APPARATUS AND METHOD FOR VISIBLE LIGHT COMMUNICATION

(71) Applicant: ELECTRONICS AND TELECOMMUNICATIONS RESEARCH INSTITUTE, Daejeon (KR)

(72) Inventors: Jin-Doo Jeong, Sejong (KR); Tae-Gyu Kang, Daejeon (KR); Myung-Soon Kim, Daejeon (KR); Sang-Kyu Lim, Daejeon (KR); Il-Soon Jang, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 132 days.

(21) Appl. No.: 15/135,699

(22) Filed: Apr. 22, 2016

(65) Prior Publication Data
US 2017/0041069 A1 Feb. 9, 2017

(30) Foreign Application Priority Data
Aug. 5, 2015 (KR) .................. 10-2015-0110442

(51) Int. Cl.
*H04B 10/116* (2013.01)
*H04B 10/516* (2013.01)
(Continued)

(52) U.S. Cl.
CPC ......... *H04B 10/116* (2013.01); *H04B 10/516* (2013.01); *H04B 10/524* (2013.01); *H04B 10/60* (2013.01)

(58) Field of Classification Search
CPC .. H04B 10/116; H04B 10/516; H04B 10/524; H04B 10/60
(Continued)

(56) References Cited

U.S. PATENT DOCUMENTS

2010/0102734 A1* 4/2010 Quick .................. G09G 3/14
                                                    315/185 R
2010/0135669 A1* 6/2010 Kim .................. H04B 10/1141
                                                    398/130
(Continued)

FOREIGN PATENT DOCUMENTS

KR   10-2010-0060900   6/2010
KR   10-2014-0030347   3/2014
KR   10-2014-0093863   7/2014

OTHER PUBLICATIONS

S.K. Lim et al., "Technology Trends of Visible Light Communication Coupled with LED Illumination", Electronics and Telecommunications Trends, 2010.
(Continued)

*Primary Examiner* — Li Liu
(74) *Attorney, Agent, or Firm* — Kile Park Reed & Houtteman PLLC

(57) ABSTRACT

Disclosed herein is visible light communication technology having improved reception performance regardless of dimming control of lighting based on VPPM signals. A visible light communication apparatus includes a preamble generator for generating a preamble signal, a header generator for generating a PHY header, which includes information about the physical layer of a transmission packet and dimming information including the target dimming level of the transmission packet, a fixed dimming VPPM modulator for modulating the PHY header into a first VPPM signal according to a predetermined ratio, a transmission unit signal processor for generating transmission data by performing
(Continued)

signal processing for data to be transmitted, a variable dimming VPPM modulator for modulating the transmission data into a second VPPM signal having the target dimming level of the transmission packet, and a signal synthesizer for forming the transmission packet by combining the first and second VPPM signals.

20 Claims, 8 Drawing Sheets

(51) Int. Cl.
*H04B 10/60* (2013.01)
*H04B 10/524* (2013.01)

(58) Field of Classification Search
USPC .......................... 398/118–127, 172, 189–191
See application file for complete search history.

(56) References Cited

U.S. PATENT DOCUMENTS

| 2011/0026918 | A1  | 2/2011 | Kim et al. |
| 2011/0069962 | A1* | 3/2011 | Castor ............... H04B 10/1149 398/115 |
| 2013/0004182 | A1* | 1/2013 | Kim ..................... H04B 10/116 398/118 |
| 2014/0010540 | A1* | 1/2014 | Jeong .................. H04B 10/116 398/66 |
| 2015/0008846 | A1* | 1/2015 | Chen ..................... H04L 69/18 315/294 |

OTHER PUBLICATIONS

Kwonhyung Lee et al., "Modulations for Visible Light Communications With Dimming Control", IEEE Photonics Technology Letters, vol. 23, No. 16, Aug. 15, 2011.

* cited by examiner

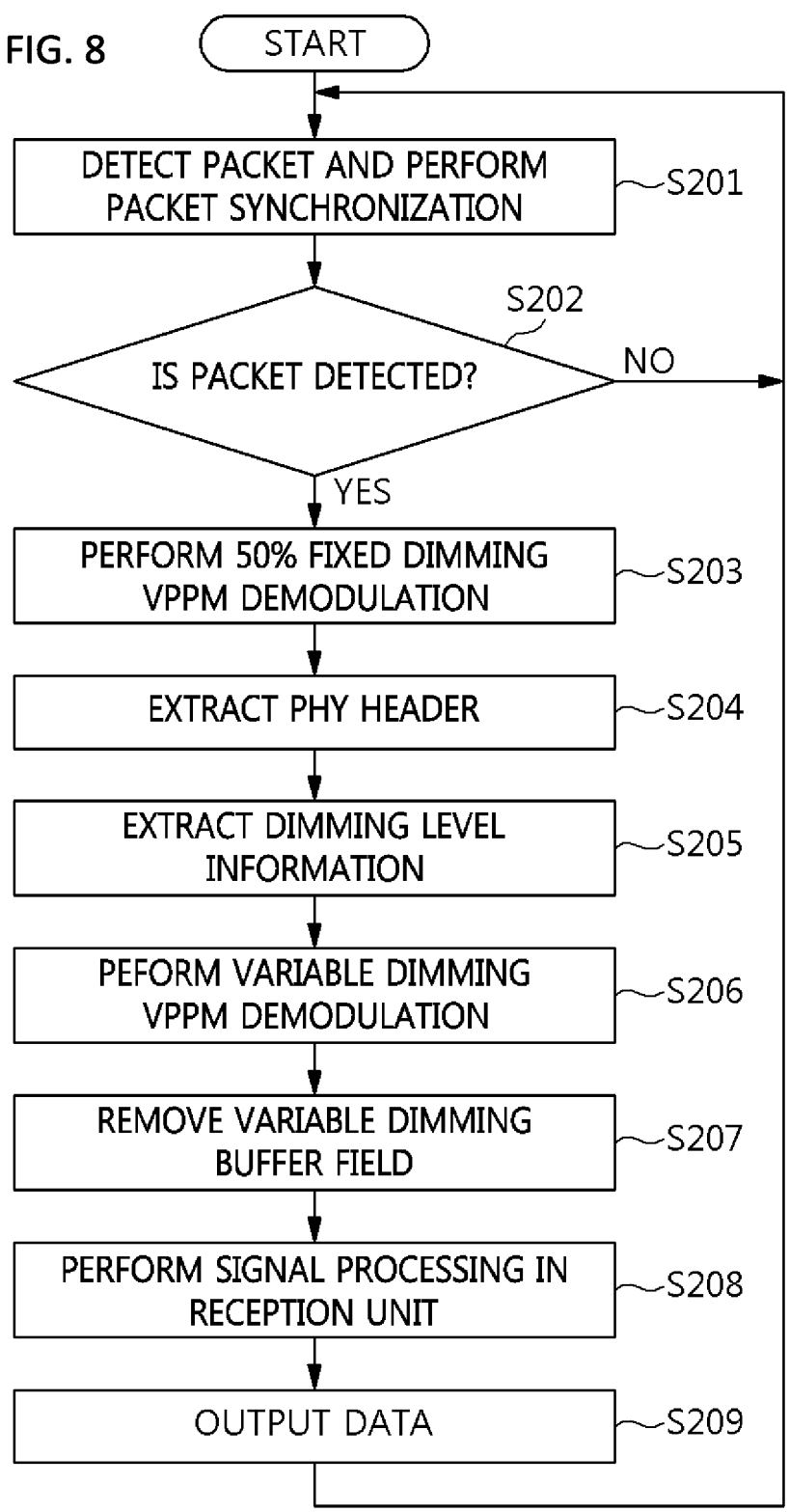

APPARATUS AND METHOD FOR VISIBLE LIGHT COMMUNICATION

CROSS REFERENCE TO RELATED APPLICATION

This application claims the benefit of Korean Patent Application No. 10-2015-0110442, filed Aug. 5, 2015, which is hereby incorporated by reference in its entirety into this application.

BACKGROUND OF THE INVENTION

1. Technical Field

The present invention relates generally to an apparatus and method for visible light communication and, more particularly, to an apparatus and method for visible light communication that have improved reception performance regardless of dimming control of lighting based on VPPM signals.

2. Description of the Related Art

A visible light communication system that uses lighting such as LEDs or the like is a system for transmitting and receiving information based on lighting that emits visible light. Therefore, wireless communication must be performed under the condition in which basic functions of the lighting are still satisfied. Because one of the important functions of lighting is to control the brightness of the lighting, that is, a dimming function, the visible light communication system must have not only a wireless communication function using visible light but also a dimming function. In connection with visible light communication, techniques for controlling the brightness of lighting include an amplitude dimming method and a Variable Pulse Position Modulation (VPPM) dimming method. The amplitude dimming method adjusts the brightness of a light source by varying the amplitude of a signal in an OOK modulation technique, and the VPPM method provides a brightness control function by changing the width of a pulse.

VPPM is a new modulation method devised from a 2-PPM method and a Pulse Width Modulation (PWM) method in order to prevent the occurrence of intra-frame flickering and to control the brightness of a light source, and is one of the modulation methods for visible light communication adopted in the IEEE 802.15.7 standard. The 2-PPM method represents bit "0" and "1" depending on the position of a pulse as shown in FIG. 1 and provides the same average brightness for both "0" and "1" as being similar to optical power in Manchester code. Therefore, this method may prevent the occurrence of intra-frame flickering. Also, the PWM method controls the brightness of a light source by varying the width of a pulse, and is commonly used in current LED lighting. Meanwhile, the VPPM method is similar to the characteristic of 2-PPM in that it represents bit "0" and "1" depending on the position of a pulse, and is similar to a PWM method in that the width of a pulse may change depending on the brightness desired by a user. Therefore, as shown in FIG. 2, an optical waveform modulated to have a 50% pulse width using the VPPM scheme is the same as a waveform modulated using 2-PPM. Also, FIG. 2 illustrates a mechanism for controlling brightness using a VPPM method, and shows an example in which, when a digital signal "001" is modulated using the VPPM technique, the brightness is changed depending on the variation of the pulse width, even for the same data. Additionally, the VPPM technique divides a level of the pulse width into smaller levels, whereby it is possible to provide maximum brightness similar to that of LED lighting having the same specifications. Also, because the brightness is adjusted depending on the pulse width on the time axis rather than the amplitude of a pulse, a LED light source may be prevented from being damaged and color variation of the light source may be avoided.

Meanwhile, in the digital wireless communication system, a signal may be transmitted by a packet unit or a frame unit. FIG. 3 shows a packet structure generally used in the digital wireless communication system. A preamble is a signal used for detecting a received packet and performing synchronization on the receiver side. In other words, the preamble functions to detect the packet signal in the signals entering the input unit of the receiver and to indicate the start of the packet. After the preamble, a PHY header is located. The PHY header (Physical Layer Fields) contains physical layer information for easily demodulating the modulated transmission data. The physical layer information, generally used in visible light communication, includes a packet length, a channel coding scheme, a line coding scheme, and the like, and these pieces of information are contained in the PHY header and transmitted. Data to be transmitted through the physical layer follows the PHY header, and the data is expressed as Payload in terms of the physical layer.

Recently, with respect to visible light communication, research for improving the performance of reception of VPPM signals is actively being conducted.

Korean Patent Application Publication No. 2010-0060900 discloses a method for enabling visible light communication without impeding the brightness control function of lighting in a lighting device using LEDs, but does not disclose technology for improving the performance of reception of VPPM signals.

SUMMARY OF THE INVENTION

An object of the present invention is to provide visible light communication technology that has improved reception performance regardless of dimming control of lighting based on VPPM signals.

Also, another object of the present invention is to improve reception performance by decreasing a bit error rate (BER) of data in visible light communication.

A further object of the present invention is to minimize an error rate in receiving a PHY header that includes physical layer information and dimming level information, which is necessary in order to demodulate a packet in visible light communication.

In order to accomplish the above object, an apparatus for visible light communication that transmits a transmission packet through visible light according to an embodiment of the present invention may include a preamble generator for generating a preamble signal; a header generator for generating a PHY header that includes dimming information and information about a physical layer of the transmission packet, the dimming information including a target dimming level of the transmission packet; a fixed dimming VPPM modulator for modulating the PHY header into a first VPPM signal according to a predetermined ratio; a transmission unit signal processor for generating transmission data by performing signal processing for data to be transmitted in order to transmit the data through visible light; a variable dimming VPPM modulator for modulating the transmission data into a second VPPM signal having the target dimming level of the transmission packet; and a signal synthesizer for forming the transmission packet by combining the preamble signal, the first VPPM signal, and the second VPPM signal.

The signal synthesizer may form the transmission packet by sequentially arranging the preamble signal, the first VPPM signal, and the second VPPM signal.

The apparatus may further include a buffer field insertion module for inserting a variable dimming buffer field between the PHY header and the transmission data.

The variable dimming VPPM modulator may modulate the variable dimming buffer field and the transmission data into the second VPPM signal having the target dimming level of the transmission packet.

The variable dimming buffer field may be formed with arbitrary virtual data.

The fixed dimming VPPM modulator may modulate the PHY header into the first VPPM signal having a 50% fixed dimming level.

The apparatus may further include an idle pattern generator for generating an idle pattern signal corresponding to the target dimming level. Also, while the transmission packet is not transmitted, the apparatus may transmit an idle packet based on the idle pattern signal through visible light.

The preamble signal may include information that is necessary for a reception unit to detect the packet and perform synchronization.

Also, in order to accomplish the above object, an apparatus for visible light communication that receives and demodulates a transmission packet transmitted from a transmission unit using visible light communication may include a reception unit for receiving the transmission packet and converting the transmission packet into an electric signal; a packet detector for detecting a preamble signal in the electric signal and performing packet synchronization; a fixed dimming VPPM demodulator for extracting a PHY header by performing VPPM demodulation for the signal, packet-synchronized by the packet detector, according to a predetermined ratio; a header extractor for extracting dimming information and information about a physical layer of the transmission packet from the PHY header, the dimming information including a target dimming level of the transmission packet; a variable dimming VPPM demodulator for generating demodulated data by performing variable dimming VPPM demodulation for the transmission packet based on the dimming information; and a reception unit signal processor for acquiring data, transmitted from the transmission unit, by performing signal processing for the demodulated data.

The apparatus may further include a buffer field removal module for removing a variable dimming buffer field from the demodulated data.

The variable dimming buffer field may be included in the demodulated data, and may be located between the PHY header and the data.

The fixed dimming VPPM demodulator may extract the PHY header by performing VPPM demodulation for the signal, packet-synchronized by the packet detector, according to a 50% fixed dimming ratio.

Also, in order to accomplish the above object, a method for visible light communication that transmits a transmission packet through visible light may include generating a preamble signal; generating a PHY header that includes dimming information and information about a physical layer of the transmission packet, the dimming information including a target dimming level of the transmission packet; modulating the PHY header into a first VPPM signal according to a predetermined ratio; generating transmission data by performing signal processing for data to be transmitted in order to transmit the data through visible light; modulating the transmission data into a second VPPM signal having the target dimming level of the transmission packet; and forming the transmission packet by combining the preamble signal, the first VPPM signal, and the second VPPM signal.

Forming the transmission packet may be configured to form the transmission packet by sequentially arranging the preamble signal, the first VPPM signal, and the second VPPM signal.

The method may further include inserting a variable dimming buffer field between the PHY header and the transmission data.

Modulating the transmission data into the second VPPM signal may be configured to modulate the variable dimming buffer field and the transmission data into the second VPPM signal having the target dimming level of the transmission packet.

Modulating the PHY header into the first VPPM signal may be configured to modulate the PHY header into the first VPPM signal having a 50% fixed dimming level.

The method may further include generating an idle pattern signal corresponding to the target dimming level; and transmitting an idle packet based on the idle pattern signal through visible light while the transmission packet is not transmitted.

The method may further include receiving, by a reception unit, the transmission packet transmitted through visible light communication and converting the transmission packet into an electric signal; detecting the preamble signal in the electric signal and performing packet synchronization; extracting the PHY header by performing VPPM demodulation for the signal, packet-synchronized by the packet detector, according to the predetermined ratio; extracting the dimming information and the information about the physical layer of the transmission packet from the PHY header, the dimming information including a target dimming level of the transmission packet; generating demodulated data by performing variable dimming VPPM demodulation for the transmission packet based on the dimming information; and acquiring data, transmitted from the transmission unit, by performing signal processing for the demodulated data.

The method may further include removing the variable dimming buffer field from the demodulated data.

BRIEF DESCRIPTION OF THE DRAWINGS

The above and other objects, features and advantages of the present invention will be more clearly understood from the following detailed description taken in conjunction with the accompanying drawings, in which:

FIG. 8 is a flowchart illustrating operation on a receiver side in a method for visible light communication according to an embodiment of the present invention.

DESCRIPTION OF THE PREFERRED EMBODIMENTS

Figure 1:
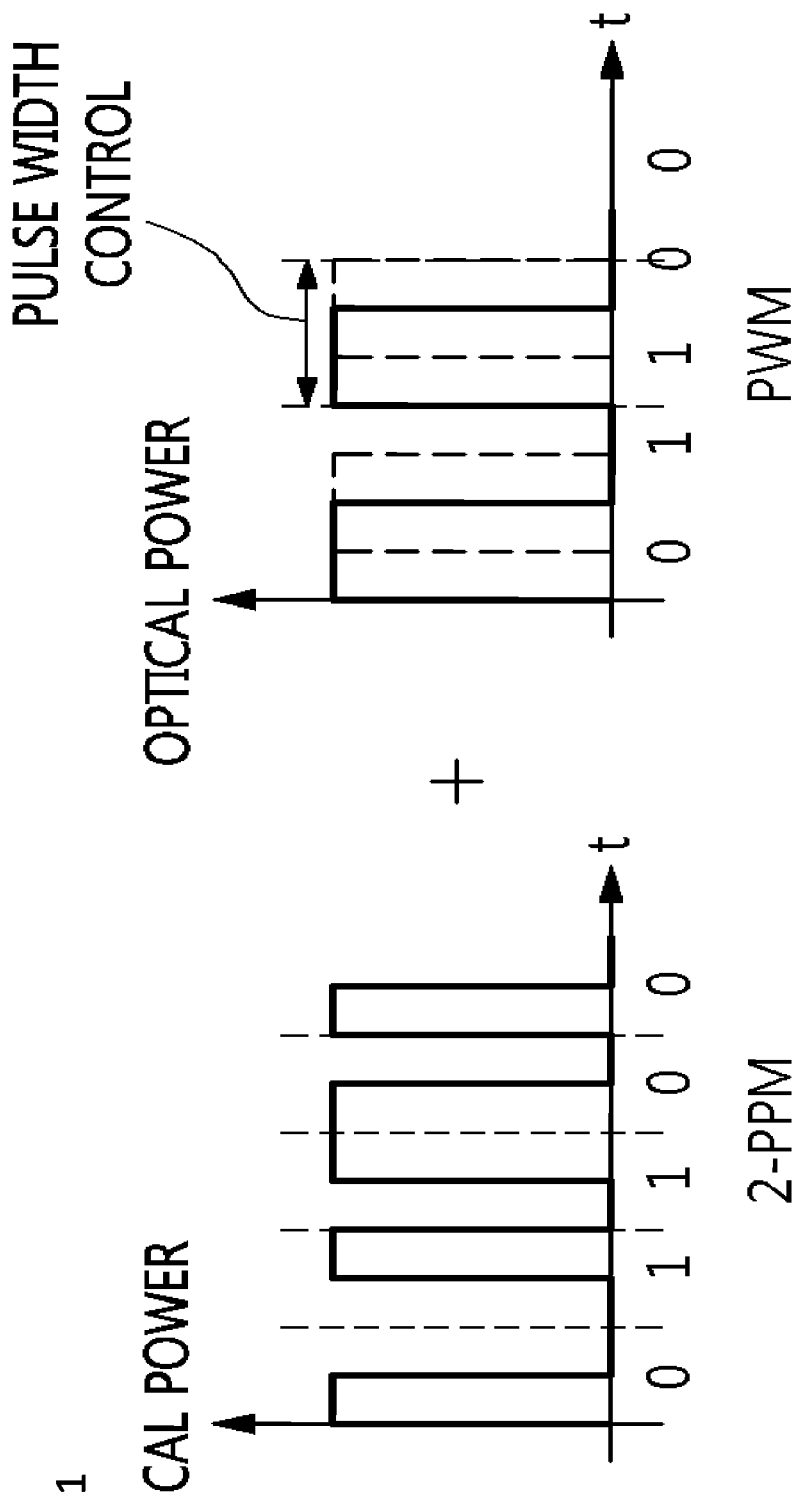
FIG. 1 illustrates a 2-PPM waveform and a PWM waveform for describing a VPPM method.
Figure 2:
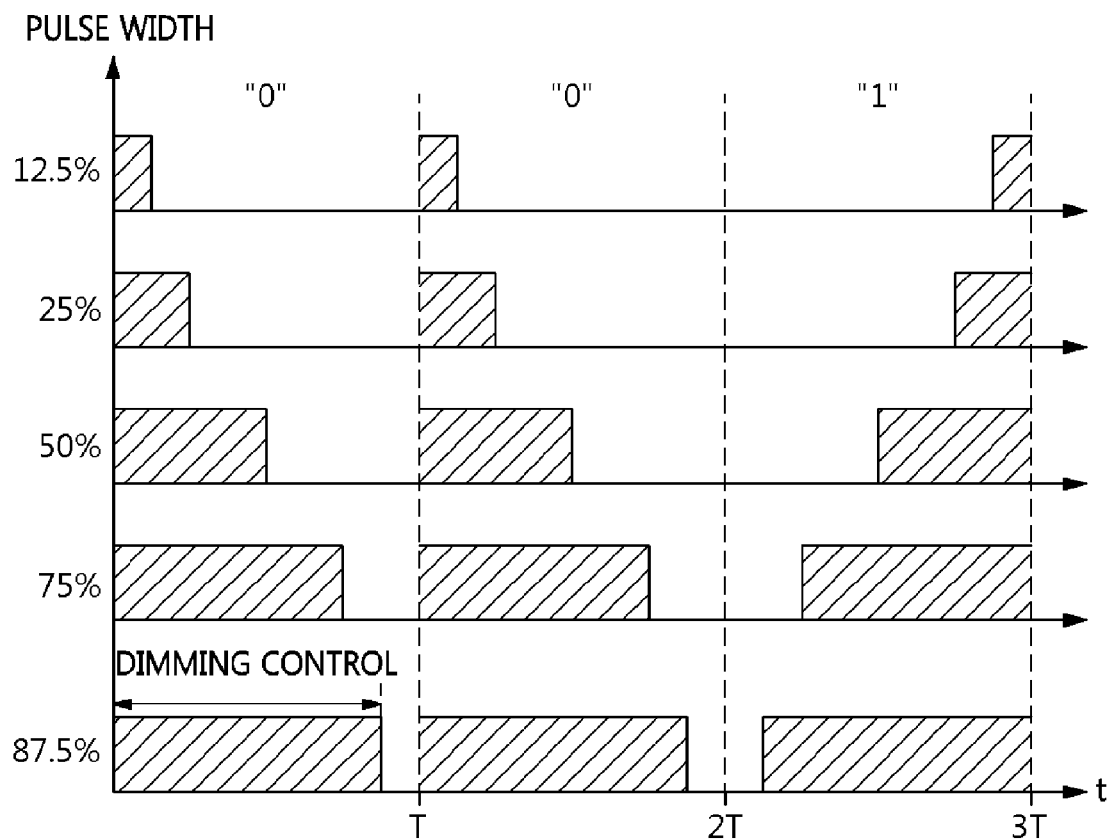
FIG. 2 is a VPPM waveform that supports a dimming control function depending on the change of a pulse width.
Figure 3:
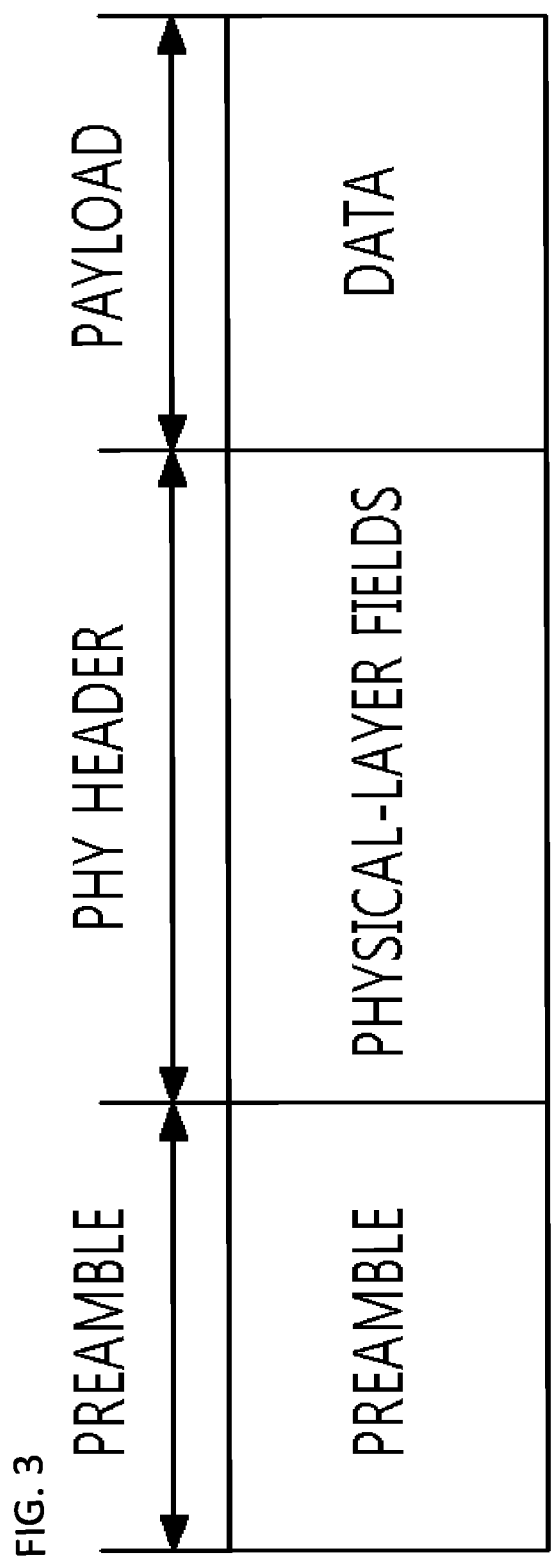
FIG. 3 is a packet structure generally used in the digital wireless communication system.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Figure 4:
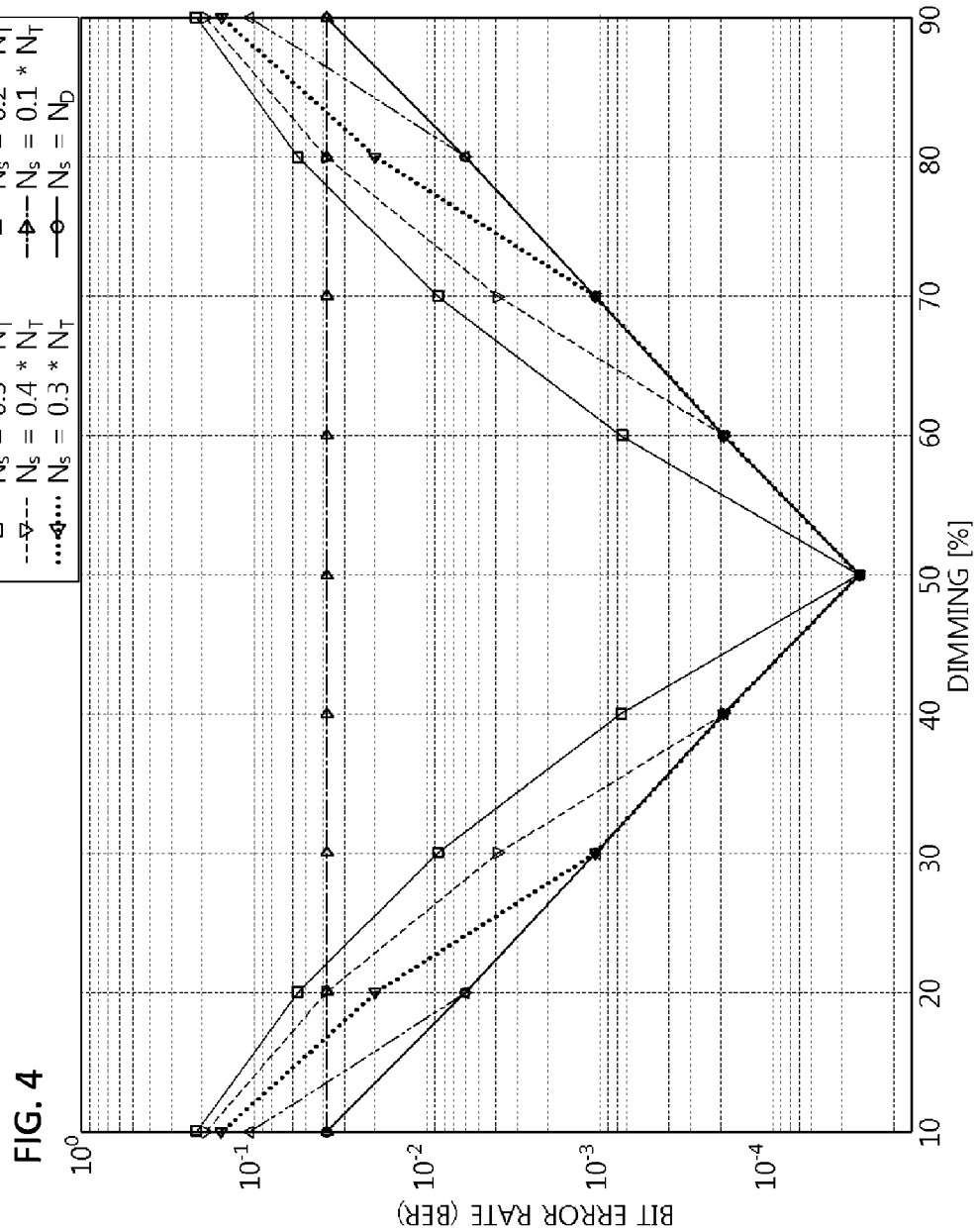
FIG. 4 illustrates simulation results concerning the Bit Error Rate (BER) performance of VPPM demodulation in which accumulation regions are set.

FIG. 4 shows simulation results concerning the Bit Error Rate (BER) performance of VPPM demodulation in which accumulation regions are set. Here, $N_s$ is the number of received signal samples that are accumulated in order to detect pulse energy. Therefore, the case in which $N_s$ is half of $N_T$ ($N_s=N_T/2$) corresponds to a generally used modulation method, $N_T$ being the number of samples per symbol. In the general modulation method ($N_s=N_T/2$), the BER performance decreases when a dimming control value is less than 50% because the energy of the transmission signal is low due to the narrow pulse width. The BER performance of the general modulation method ($N_s=N_T/2$) also decreases in a section in which the dimming control value is greater than 50%, that is, in a section in which the energy of a transmission signal is relatively high due to the wide pulse width. That is because pulse interference occurs between a time section before a symbol and a time section after the symbol. Therefore, FIG. 4 shows that the optimum VPPM demodulation performance may be achieved by a modulation method ($N_S=N_D$) in which accumulation regions are variable depending on the pulse width or the dimming level of a reception signal.

Consequently, FIG. 4 shows that it is necessary to perform VPPM demodulation variably depending on the pulse width of a reception signal, that is, a dimming level value, in order to improve the performance of reception of the VPPM signal against channel noise. In other words, reception performance may be improved only when the dimming level value of the received VPPM signal is applied to the VPPM demodulation.

The present invention proposes a packet structure for improving the reception performance in VPPM demodulation and VPPM modulation/demodulation methods using the packet structure.

Hereinafter, the configuration and operation of an apparatus for visible light communication according to an embodiment of the present invention will be described.

Figure 5:
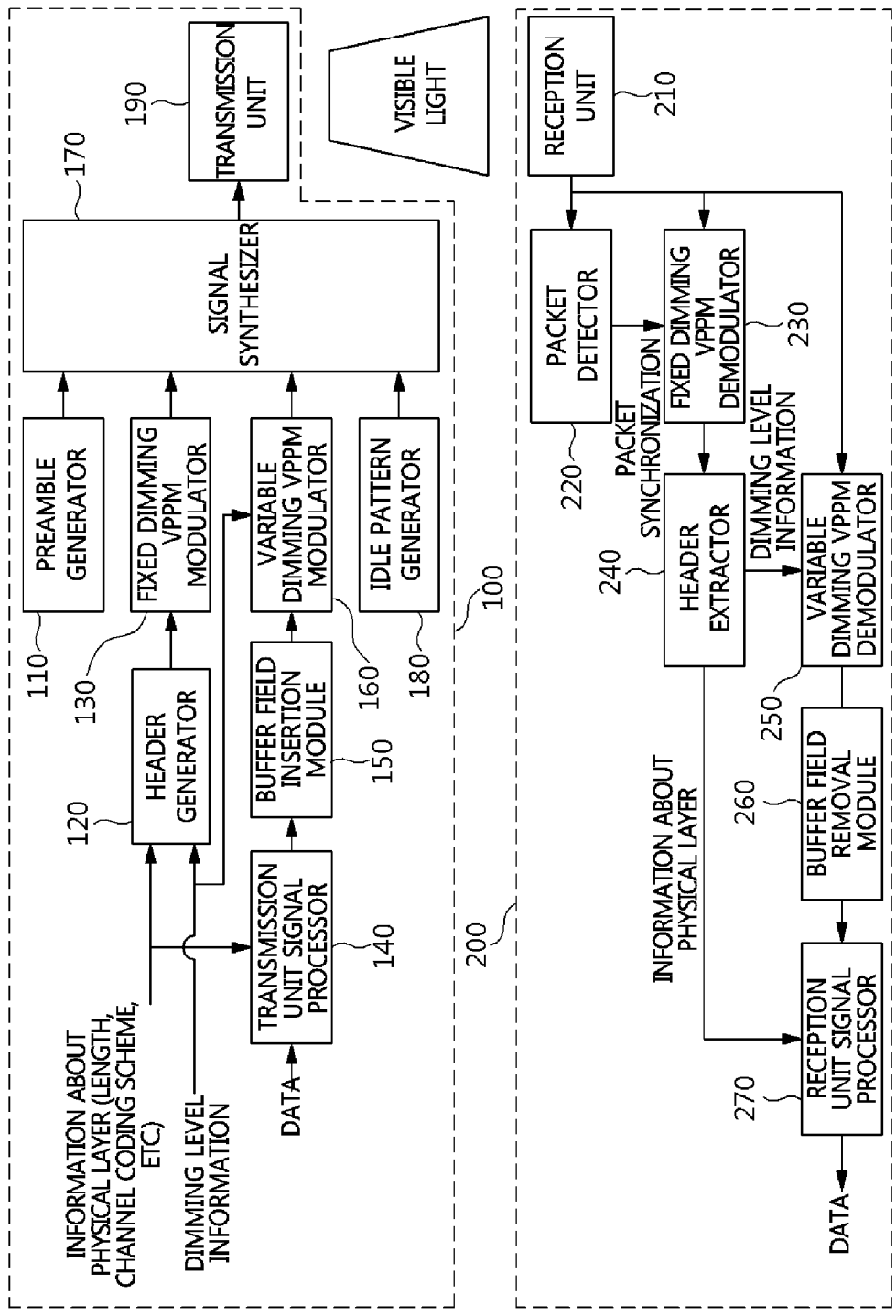
FIG. 5 is a block diagram of a transmitter and receiver of an apparatus for visible light communication according to an embodiment of the present invention.
Figure 6:
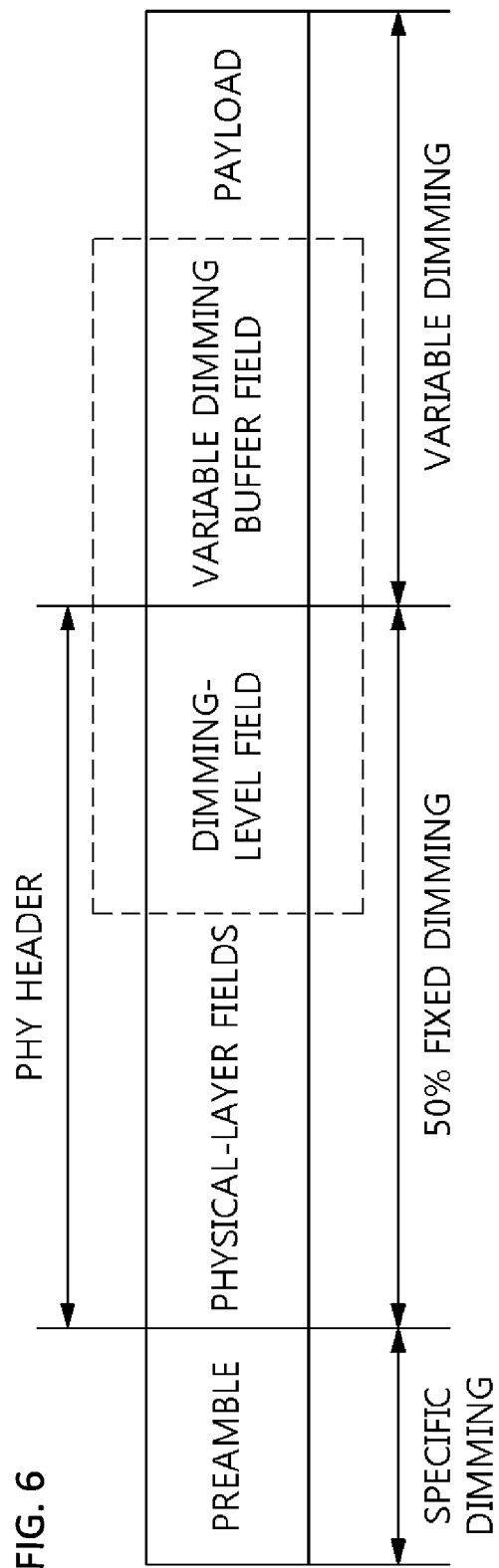
FIG. 6 illustrates the structure of a transmission packet configured for improving VPPM demodulation performance according to an embodiment of the present invention.

FIG. 5 is a block diagram of the transmitter and receiver of a visible light communication apparatus according to an embodiment of the present invention. FIG. 6 illustrates the structure of a transmission packet configured for improving VPPM demodulation performance according to an embodiment of the present invention.

Referring to FIG. 5, the visible light communication apparatus according to an embodiment of the present invention includes a visible light communication transmitter 100, which transmits a transmission packet through visible light, and a visible light communication receiver 200, which receives the transmission packet transmitted from the visible light communication transmitter 100 through visible light communication and demodulates the received packet. Hereinafter, the structure of the transmission packet, generated and transmitted by the visible light communication transmitter 100, is described with reference to FIG. 6.

Here, the visible light communication transmitter 100 may include a preamble generator 110, a header generator 120, a fixed dimming VPPM modulator 130, a transmission unit signal processor 140, a buffer field insertion module 150, a variable dimming VPPM modulator 160, a signal synthesizer 170, an idle pattern generator 180, and a transmission unit 190.

The preamble generator 110 generates a preamble signal. Here, the preamble signal includes information that is necessary for a receiver to detect a packet and to perform synchronization.

The header generator 120 generates a PHY header, which includes information about the physical layer of a transmission packet and dimming level information including the target dimming level of the transmission packet.

The fixed dimming VPPM modulator 130 modulates the PHY header into a first VPPM signal according to a predetermined ratio. Here, the fixed dimming VPPM modulator 130 may modulate the PHY header into the first VPPM signal having a 50% fixed dimming level. In other words, the predetermined ratio may be 50%.

The transmission unit signal processor 140 generates transmission data by performing signal processing for data to be transmitted in order to transmit the data through visible light.

The buffer field insertion module 150 inserts a variable dimming buffer field between the PHY header and the transmission data. Here, the variable dimming buffer field may be formed with arbitrary virtual data.

The variable dimming VPPM modulator 160 modulates the transmission data into a second VPPM signal having the target dimming level of the transmission packet. Also, the variable dimming VPPM modulator 160 may modulate both the variable dimming buffer field and the transmission data into a second VPPM signal having the target dimming level of the transmission packet.

The signal synthesizer 170 forms a transmission packet by combining the first VPPM signal and the second VPPM signal. In this case, the signal synthesizer 170 may form the transmission packet by sequentially arranging the preamble signal, the first VPPM signal, and the second VPPM signal.

The idle pattern generator 180 generates an idle pattern signal corresponding to the target dimming level. While the transmission packet is not transmitted, the visible light communication apparatus may transmit an idle packet based on the idle pattern signal through visible light via the transmission unit 190, which will be described later. Therefore, the light source stays turned on even when the packet is not transmitted.

The transmission unit 190 may be formed with an actuation circuit and a light source, and may transmit the transmission packet or the idle packet through visible light communication.

Also, the visible light communication receiver 200 includes a reception unit 210, a packet detector 220, a fixed dimming VPPM demodulator 230, a header extractor 240, a variable dimming VPPM demodulator 250, a buffer field removal module 260, and a reception unit signal processor 270.

The reception unit 210 receives the transmission packet, transmitted from the visible light communication transmitter 100 through visible light communication, and converts it into an electric signal. The reception unit 210 may be formed as a photoelectric conversion circuit.

The packet detector 220 detects the preamble signal, which includes information necessary for detecting a packet and performing synchronization, in the electric signal and performs packet synchronization.

The fixed dimming VPPM demodulator 230 extracts a PHY header by performing VPPM demodulation on the signal, which is packet-synchronized by the packet detector, according to a predetermined ratio.

The header extractor 240 extracts dimming level information, which includes the target dimming level of the transmission packet, and information about the physical layer of the transmission packet from the PHY header.

The variable dimming VPPM demodulator 250 generates demodulated data by performing variable dimming VPPM demodulation on the transmission packet based on the dimming level information.

The buffer field removal module 260 removes the variable dimming buffer field from the demodulated data. The variable dimming buffer field is generated and inserted in the transmission packet by the buffer field insertion module 150 of the visible light communication transmitter 100, and is located between the PHY header and the data. While the variable dimming buffer field is received before being removed, the reception parameters of the reception unit may adapt to the change in the dimming level, and the values thereof can be changed.

The reception unit signal processor 270 performs signal processing for the demodulated data, and acquires the data transmitted from the transmission unit 190 of the visible light communication transmitter 100.

Hereinafter, a visible light communication method according to an embodiment of the present invention will be described.

Figure 7:
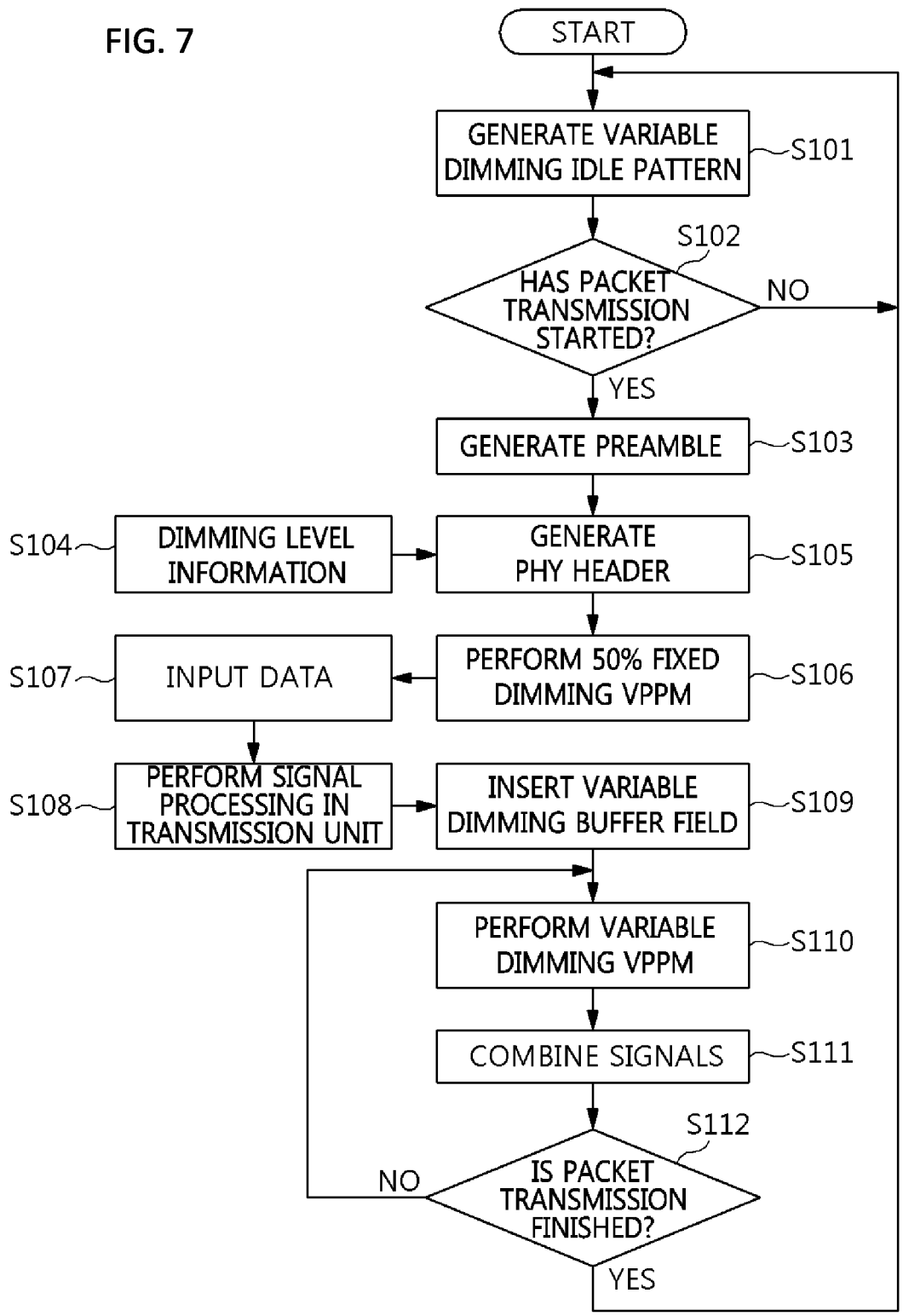
FIG. 7 is a flowchart illustrating operation on a transmitter side in a method for visible light communication according to an embodiment of the present invention.

FIG. 7 is a flowchart of operation in a transmitter side in a visible light communication method according to an embodiment of the present invention.

Referring to FIG. 7, in the visible light communication method according to an embodiment of the present invention, first at step S101, the visible light communication transmitter outputs an idle pattern signal that corresponds to a dimming level to be applied to make a light source stay turned on even while a packet is not transmitted (that is, a target dimming level). While a transmission packet is not transmitted, an idle packet based on the idle pattern signal may be transmitted through visible light.

Then, it is determined whether the packet starts to be transmitted at step S102.

When it is determined at step S102 that the packet starts to be transmitted, a preamble signal corresponding to the head of the packet is generated at step S103.

Then, dimming level information, which includes the target dimming level of the transmission packet, is acquired at step S104, and a PHY header, which includes the dimming level information and information about the physical layer of the transmission packet, is generated at step S105. The information about the physical layer, generally used in visible light communication, may include a packet length, a channel coding scheme, a line coding scheme, and the like, and these pieces of information may be contained in the PHY header to be transmitted.

Then, the PHY header, generated at step S105, is modulated into a first VPPM signal according to a predetermined ratio at step S106. Here, the PHY header may be modulated into the first VPPM signal by passing through a 50% fixed dimming VPPM modulator. In other words, the predetermined ratio may be 50%.

Then, data to be transmitted is input to the visible light communication transmitter at step S107.

Then, transmission data is generated by performing signal processing for the data to be transmitted at step S108 in order to transmit it through visible light.

Then, a variable dimming buffer field is inserted between the PHY header and the transmission data at step S109.

The transmission data is modulated into a second VPPM signal having the target dimming level of the transmission packet through variable dimming VPPM at step S110. At step S110, the variable dimming buffer field and the transmission data may be modulated into the second VPPM signal having the target dimming level of the transmission packet.

The transmission packet is generated by combining the preamble signal, the first VPPM signal, and the second VPPM signal at step S111. At step S111, the transmission packet may be generated by sequentially arranging the preamble signal, the first VPPM signal, and the second VPPM signal.

Then, it is determined at step S112 whether the transmission of the transmission packet is finished. If the transmission is not finished, variable dimming VPPM is continuously performed. Otherwise, the process returns to step S101.

FIG. 8 is a flowchart of operation on a receiver side in a visible light communication method according to an embodiment of the present invention.

Referring to FIG. 8, in the visible light communication method according to an embodiment of the present invention, first, the reception unit of the visible light communication receiver receives the transmission packet transmitted through visible light communication, converts it into an electric signal, and performs packet synchronization by detecting the preamble signal in the electric signal at step S201.

Then, it is determined whether the packet is found at step S202. If so, the packet-synchronized signal is demodulated according to the predetermined ratio through VPPM demodulation at step S203, and a PHY header is extracted at step S204.

Then, the dimming level information, which includes the target dimming level of the transmission packet, and the information about the physical layer of the transmission packet are extracted from the PHY header at step S205.

Then, demodulated data is generated by performing variable dimming VPPM demodulation on the transmission packet based on the dimming level information at step S206.

Also, the variable dimming buffer field is removed from the demodulated data at step S207. Here, the variable dimming buffer field provides buffering time during which the reception parameters of the reception unit adapt to the change in the dimming level and the values thereof are changed when the packet is received.

The signal processing is performed for the demodulated data at step S208, whereby the data transmitted from the transmission unit of the visible light communication transmitter is acquired and output at step S209.

An apparatus and method for visible light communication according to an embodiment of the present invention extracts the dimming level information in the received packet from the PHY header, which passed through a 50% fixed dimming VPPM demodulator, and then detects reception data in the received packet by performing variable dimming VPPM demodulation based on the extracted dimming level information. Here, because time that is necessary for the parameters of the reception unit to adapt to the change from the dimming level set in the PHY header to the dimming level set in the data area is provided, the VPPM reception performance may be improved.

According to the present invention, reception performance may be improved by transmitting a packet that contains dimming level information about dimming control of lighting in visible light communication. Furthermore, the present invention may provide visible light communication that has improved reception performance regardless of dimming control of lighting.

Also, the present invention may improve reception performance by decreasing a Bit Error Rate (BER) of data in visible light communication.

Also, the present invention may minimize an error rate in receiving a PHY header that includes physical layer information and dimming level information, which are necessary when demodulating a packet in visible light communication.

As described above, an apparatus and method for visible light communication according to the present invention are not limitedly applied to the configurations and operations of the above-described embodiments, but all or some of the embodiments may be selectively combined and configured so that the embodiments may be modified in various ways.

What is claimed is:

1. An apparatus for visible light communication that transmits a transmission packet through visible light, comprising:
    a preamble generator for generating a preamble signal;
    a header generator for generating a PHY header that includes dimming information and information about a physical layer of the transmission packet, the dimming information including a target dimming level of the transmission packet;
    a fixed dimming VPPM modulator for modulating the PHY header into a first VPPM signal according to a predetermined ratio;
    a transmission unit signal processor for generating transmission data by performing signal processing for data to be transmitted in order to transmit the data through visible light;
    a variable dimming VPPM modulator for modulating the transmission data into a second VPPM signal having the target dimming level of the transmission packet; and
    a signal synthesizer for forming the transmission packet by combining the preamble signal, the first VPPM signal, and the second VPPM signal.

2. The apparatus of claim 1, wherein the signal synthesizer forms the transmission packet by sequentially arranging the preamble signal, the first VPPM signal, and the second VPPM signal.

3. The apparatus of claim 2, further comprising,
    a buffer field insertion module for inserting a variable dimming buffer field between the PHY header and the transmission data.

4. The apparatus of claim 3, wherein the variable dimming VPPM modulator modulates the variable dimming buffer field and the transmission data into the second VPPM signal having the target dimming level of the transmission packet.

5. The apparatus of claim 3, wherein the variable dimming buffer field is formed with arbitrary virtual data.

6. The apparatus of claim 1, wherein the fixed dimming VPPM modulator modulates the PHY header into the first VPPM signal having a 50% fixed dimming level.

7. The apparatus of claim 1, further comprising,
    an idle pattern generator for generating an idle pattern signal corresponding to the target dimming level,
    wherein while the transmission packet is not transmitted, the apparatus transmits an idle packet based on the idle pattern signal through visible light.

8. The apparatus of claim 1, wherein the preamble signal includes information that is necessary for a reception unit to detect the packet and perform synchronization.

9. An apparatus for visible light communication that receives and demodulates a transmission packet transmitted from a transmission unit using visible light communication, comprising:
    a reception unit for receiving the transmission packet and converting the transmission packet into an electric signal;
    a packet detector for detecting a preamble signal in the electric signal and performing packet synchronization;
    a fixed dimming VPPM demodulator for extracting a PHY header by performing VPPM demodulation for the signal, packet-synchronized by the packet detector, according to a predetermined ratio;
    a header extractor for extracting dimming information and information about a physical layer of the transmission packet from the PHY header, the dimming information including a target dimming level of the transmission packet;
    a variable dimming VPPM demodulator for generating demodulated data by performing variable dimming VPPM demodulation for the transmission packet based on the dimming information; and
    a reception unit signal processor for acquiring data, transmitted from the transmission unit, by performing signal processing for the demodulated data.

10. The apparatus of claim 9, further comprising,
    a buffer field removal module for removing a variable dimming buffer field from the demodulated data.

11. The apparatus of claim 10, wherein the variable dimming buffer field is included in the demodulated data, and is located between the PHY header and the data.

12. The apparatus of claim 9, wherein the fixed dimming VPPM demodulator extracts the PHY header by performing VPPM demodulation for the signal, packet-synchronized by the packet detector, according to a 50% fixed dimming ratio.

13. A method for visible light communication that transmits a transmission packet through visible light, comprising:
    generating a preamble signal;
    generating a PHY header that includes dimming information and information about a physical layer of the transmission packet, the dimming information including a target dimming level of the transmission packet;
    modulating the PHY header into a first VPPM signal according to a predetermined ratio;
    generating transmission data by performing signal processing for data to be transmitted in order to transmit the data through visible light;
    modulating the transmission data into a second VPPM signal having the target dimming level of the transmission packet; and
    forming the transmission packet by combining the preamble signal, the first VPPM signal, and the second VPPM signal.

14. The method of claim 13, wherein forming the transmission packet is configured to form the transmission packet by sequentially arranging the preamble signal, the first VPPM signal, and the second VPPM signal.

15. The method of claim 14, further comprising,
    inserting a variable dimming buffer field between the PHY header and the transmission data.

16. The method of claim 15, wherein modulating the transmission data into the second VPPM signal is configured to modulate the variable dimming buffer field and the transmission data into the second VPPM signal having the target dimming level of the transmission packet.

17. The method of claim 13, wherein modulating the PHY header into the first VPPM signal is configured to modulate the PHY header into the first VPPM signal having a 50% fixed dimming level.

18. The method of claim 13, further comprising:
generating an idle pattern signal corresponding to the target dimming level; and
transmitting an idle packet based on the idle pattern signal through visible light while the transmission packet is not transmitted.

19. The method of claim 13, further comprising:
by a reception unit, receiving the transmission packet transmitted through visible light communication and converting the transmission packet into an electric signal;
detecting the preamble signal in the electric signal and performing packet synchronization;
extracting the PHY header by performing VPPM demodulation for the signal, packet-synchronized by the packet detector, according to the predetermined ratio;
extracting the dimming information and the information about the physical layer of the transmission packet from the PHY header, the dimming information including a target dimming level of the transmission packet;
generating demodulated data by performing variable dimming VPPM demodulation for the transmission packet based on the dimming information; and
acquiring data, transmitted from the transmission unit, by performing signal processing for the demodulated data.

20. The method of claim 19, further comprising,
removing the variable dimming buffer field from the demodulated data.

* * * * *